United States Patent
Laakso et al.

(10) Patent No.: US 9,869,413 B2
(45) Date of Patent: Jan. 16, 2018

(54) CLAMPING RING

(75) Inventors: Jyri Laakso, Nastola (FI); Mika Savolainen, Nastola (FI)

(73) Assignee: Uponor Innovation Ab, Virsbo (SE)

( * ) Notice: Subject to any disclaimer, the term of this patent is extended or adjusted under 35 U.S.C. 154(b) by 1048 days.

(21) Appl. No.: 13/983,143

(22) PCT Filed: Jan. 31, 2012

(86) PCT No.: PCT/EP2012/051539
§ 371 (c)(1),
(2), (4) Date: Aug. 1, 2013

(87) PCT Pub. No.: WO2012/104291
PCT Pub. Date: Aug. 9, 2012

(65) Prior Publication Data
US 2013/0307260 A1  Nov. 21, 2013

(30) Foreign Application Priority Data
Feb. 1, 2011 (EP) .................... 11152871

(51) Int. Cl.
*B29C 65/66* (2006.01)
*F16L 13/14* (2006.01)
(Continued)

(52) U.S. Cl.
CPC .......... *F16L 13/14* (2013.01); *B29C 45/0025* (2013.01); *B29C 65/64* (2013.01);
(Continued)

(58) Field of Classification Search
CPC ..... F19L 47/22; F19L 33/207; B29L 2031/24; B29C 65/66; B29C 65/70; B29C 66/73755; F16L 47/22; F16L 33/207
(Continued)

(56) References Cited

U.S. PATENT DOCUMENTS 2,433,602 A * 12/1947 Coss ................ F16L 33/02
285/242
3,262,721 A * 7/1966 Knight ............. F16L 33/227
285/148.14
(Continued)

FOREIGN PATENT DOCUMENTS

DE  19546917   6/1996
EP   1741968   1/2007
(Continued)

OTHER PUBLICATIONS

Beloshenko, V.A., et al., "The shape memory effect in polymers", 2005 Russ. Chem. Rev. 74 (3) 265, including English Abstract (IOPScience, "The shape memory effect in polymers", http://iopscience.iop.org).

*Primary Examiner* — David E Bochna
(74) *Attorney, Agent, or Firm* — Occhiuti & Rohlicek LLP (57) ABSTRACT

A clamping ring that presses an end of a pipe against a connecting piece by back shrinkage. The clamping ring comprises a body comprising a plastic material having memory properties. The body has a first end to be positioned at a distance from the end of the pipe and a second end to be positioned close to the end of the pipe. The body of the clamping ring has a first position at the first end or at the distance from the first end having a first radial wall thickness. The body of the clamping ring has at least one second position between the first position and the second end such that the body of the clamping ring has a second radial wall thickness at the second position. The second radial wall thickness is smaller than the first radial wall thickness.

20 Claims, 6 Drawing Sheets (51) Int. Cl.
  *B29C 45/00* (2006.01)
  *F16L 47/22* (2006.01)
  *B29C 65/64* (2006.01)
  *B29C 65/68* (2006.01)
  *B29C 65/00* (2006.01)
  *B29K 23/00* (2006.01)
  *B29L 31/24* (2006.01)

(52) U.S. Cl.
  CPC .............. *B29C 65/66* (2013.01); *B29C 65/68* (2013.01); *B29C 66/112* (2013.01); *B29C 66/114* (2013.01); *B29C 66/1122* (2013.01); *B29C 66/5229* (2013.01); *B29C 66/52241* (2013.01); *B29C 66/5344* (2013.01); *B29C 66/73152* (2013.01); *B29C 66/742* (2013.01); *F16L 47/22* (2013.01); *B29C 66/71* (2013.01); *B29C 66/73755* (2013.01); *B29K 2023/0691* (2013.01); *B29L 2031/24* (2013.01); *F16L 2201/10* (2013.01)

(58) Field of Classification Search
  USPC .......................................... 285/381.4, 381.5
  See application file for complete search history.

(56) References Cited

U.S. PATENT DOCUMENTS

| | | | | |
|---|---|---|---|---|
| 3,315,986 A * | 4/1967 | Quick | ................. | F16L 25/0036 138/109 |
| 3,320,355 A * | 5/1967 | Booker | ................. | H01R 4/203 174/84 R |
| 3,415,287 A * | 12/1968 | Lanza | ..................... | B29C 61/06 138/141 |
| 3,588,150 A * | 6/1971 | Wold | ................. | H01R 13/502 174/74 R |
| 3,957,382 A * | 5/1976 | Greuel, Jr. | ........ | B29C 61/0616 156/155 |
| 3,975,039 A * | 8/1976 | Penneck | ................ | B29C 65/68 156/86 |
| 4,021,061 A * | 5/1977 | Zimmerman | ........... | F16L 37/05 285/13 |
| 4,313,629 A * | 2/1982 | Winterhalter | ....... | F16L 33/2071 285/242 |
| 4,352,652 A * | 10/1982 | Barber | ................ | B29C 45/0055 264/573 |
| 4,408,694 A | 10/1983 | Mueller | | |
| 4,537,183 A * | 8/1985 | Fogarty | ............ | A61B 17/12099 128/DIG. 25 |
| 4,635,972 A * | 1/1987 | Lyall | ....................... | F16L 31/00 285/242 |
| 4,650,228 A * | 3/1987 | McMills | .............. | B29C 61/006 156/86 |
| 4,705,657 A * | 11/1987 | Poulin | .................. | B29C 61/003 264/230 |
| 4,750,764 A * | 6/1988 | Gibellina | .............. | F16L 33/225 285/255 |
| 4,911,484 A | 3/1990 | Hackforth | | |
| 4,929,236 A * | 5/1990 | Sampson | .............. | F16L 37/084 128/912 |
| 5,169,176 A * | 12/1992 | Brossard | ................. | B29C 65/68 156/84 |
| 5,470,113 A * | 11/1995 | Schwalm | .............. | F16L 33/225 285/255 |
| 5,531,483 A * | 7/1996 | Christian | ................ | F16L 33/02 156/86 |
| 5,566,988 A * | 10/1996 | Johnston | ................. | F16L 47/22 285/242 |
| 5,637,102 A * | 6/1997 | Tolkoff | ................. | F16L 33/225 285/417 |
| 5,660,660 A * | 8/1997 | Greuel, Jr. | .............. | F16L 47/22 138/99 |
| 5,700,528 A * | 12/1997 | Fitch | ....................... | F16L 33/02 174/DIG. 8 |
| 5,735,554 A * | 4/1998 | Imgam | .................... | B29C 65/66 285/239 |
| 6,015,600 A | 1/2000 | Greuel et al. | | |
| 6,113,572 A * | 9/2000 | Gailey | .................. | F16L 33/225 285/242 |
| 6,543,138 B1 * | 4/2003 | Berry | ................. | A61M 39/1011 285/242 |
| 6,641,177 B1 * | 11/2003 | Pinciaro | ................ | F16L 33/225 285/242 |
| 7,331,613 B2 * | 2/2008 | Schulte | .............. | A61M 39/1011 285/239 |
| 7,452,354 B2 * | 11/2008 | Bright | ..................... | F16L 33/30 604/533 |
| 8,870,236 B2 * | 10/2014 | Rule | ........................ | F16L 21/00 285/321 |
| 2008/0136180 A1 * | 6/2008 | Dittmar | .................. | F16L 47/22 285/381.2 |
| 2009/0152864 A1 * | 6/2009 | Olinger | ............... | B29C 66/1142 285/242 |
| 2015/0069755 A1 * | 3/2015 | Bull | ........................ | F16L 37/122 285/406 |
| 2015/0362109 A1 * | 12/2015 | Buchanan | ............... | F16L 47/22 285/399 |

FOREIGN PATENT DOCUMENTS

| | | | | |
|---|---|---|---|---|
| EP | 2888306 | | 1/2007 | |
| NL | 1004791 C2 * | | 6/1998 | ........ B29C 45/1676 |
| WO | 95/26480 | | 10/1995 | |
| WO | WO 2007006863 A1 * | | 1/2007 | ........ B29C 45/0025 |
| WO | WO2014/078095 A2 | | 5/2014 | |

* cited by examiner

CLAMPING RING

FIELD OF THE INVENTION

The invention relates to a clamping ring.

BACKGROUND OF THE INVENTION

It is known to provide a pipe connection between one end of a pipe made of a plastic material that has memory properties and a connecting piece. The memory properties mean that plastic pipes with a memory capacity automatically tend to return essentially to their original shape and form after having been expanded. For example plastic pipes that are manufactured from cross-linked polyethylene possess an active memory capacity at temperatures as low as room temperature. Pipes of this nature are joined together by widening one end of the pipe and inserting into the widened pipe end a flanged connector which forms a part of the pipe-connecting piece, normally made of metal, and which is retained in said pipe end until the pipe has shrunk to an extent at which it is able to firmly hold the connecting piece. A clamping ring made of elastic material, which may be the same plastic material as that from which the pipe is made, is expanded and shrunk over the pipe end in order to further enhance the holding and sealing pressure at the pipe connection region. The clamping ring is expanded at the same time as the pipe end is expanded, with the clamping ring in position around said pipe end. Such a solution has been disclosed for example in EP 0 530 387. In EP 0 530 387 the clamping ring has been made from an extruded pipe by cutting the pipe into a short enough part to form a clamping ring. In WO 2009/004407 the clamping ring has also been made by cutting an extruded pipe to form a pipe part and bending the end of the pipe part such that a clamping ring having a stop edge is formed. In EP 1 741 968 the clamping ring is made by injection molding.

BRIEF DESCRIPTION OF THE INVENTION

The invention is characterized by the features of the independent claims.

According to one aspect, a clamping ring presses an end of a pipe against a connecting piece by back shrinkage. The clamping ring comprises a body to be positioned on the outer surface of the pipe. The body comprises a plastic material having memory properties. The body of the clamping ring has a first end to be positioned at a distance from the end of the pipe and a second end to be positioned close to the end of the pipe. Further, the body of the clamping ring has a first position at the first end or at a distance from the first end, whereby the body of the clamping ring has a first radial wall thickness at the first position. The body of the clamping ring has at least one second position between the first position and the second end such that the body of the clamping ring has a second radial wall thickness at the second position, which second radial wall thickness is smaller than the first radial wall thickness.

According to one embodiment, the body of the clamping ring has an irregular outer surface. The irregularities can be formed by ridges or grooves or both, for example. Irregularities on the outer surface of the clamping ring improve the handling of the clamping ring because it is easy to grip and handle the clamping ring. In other words, the irregularities improve the grip of the assembler on the clamping ring. Ridges improve the strength of the clamping ring. Yet further ridges improve the cooling of the material during an injection moulding process.

In another embodiment, seen from the first end of the clamping ring, the wall thickness first increases and thereafter decreases. In yet another embodiment, seen from the first end, the wall thickness first decreases and thereafter increases. By alternately increasing and decreasing the wall thickness it is possible to direct the pressing force of the clamping ring towards a desired location of a nipple end of the connection peace.

According to yet another embodiment, the second end of the clamping ring is provided with an inward extending stop edge. The stop edge ensures that the clamping ring remains positioned at a correct position at the pipe end when the pipe connection is being made and after the pipe connection has been made.

According to yet another embodiment, a clamping ring is made by injection moulding such that the material is injected close to one end of the clamping ring. With such a solution, the strength of the clamping ring and the pressing force of the clamping ring are extremely good.

According to yet another embodiment, the outer surface of the clamping ring is provided with a marking. The marking can be made by using a colouring agent, for example. The colouring agent may be such that its optical appearance changes when the clamping ring is expanded. Thus, the marking can be made such that its colour disappears during the expansion of the clamping ring, for example. Thereby, it can be easily detected that the clamping ring has been expanded, and its re-use can be avoided, which improves the quality of the pipe connections. By colour markings useful information can also be distributed for example such that a clamping ring and a pipe having the same size have a similar colour marking.

BRIEF DESCRIPTION OF THE DRAWINGS

In the following, the invention will be described in greater detail by means of preferred embodiments with reference to the accompanying drawings in which FIG. 1 schematically shows a cross sectional side view of a pipe connection.

DETAILED DESCRIPTION OF THE INVENTION

For the sake of clarity, the figures show some embodiments of the invention in a simplified manner. In the figures, like reference numerals identify like elements.

Figure 1:
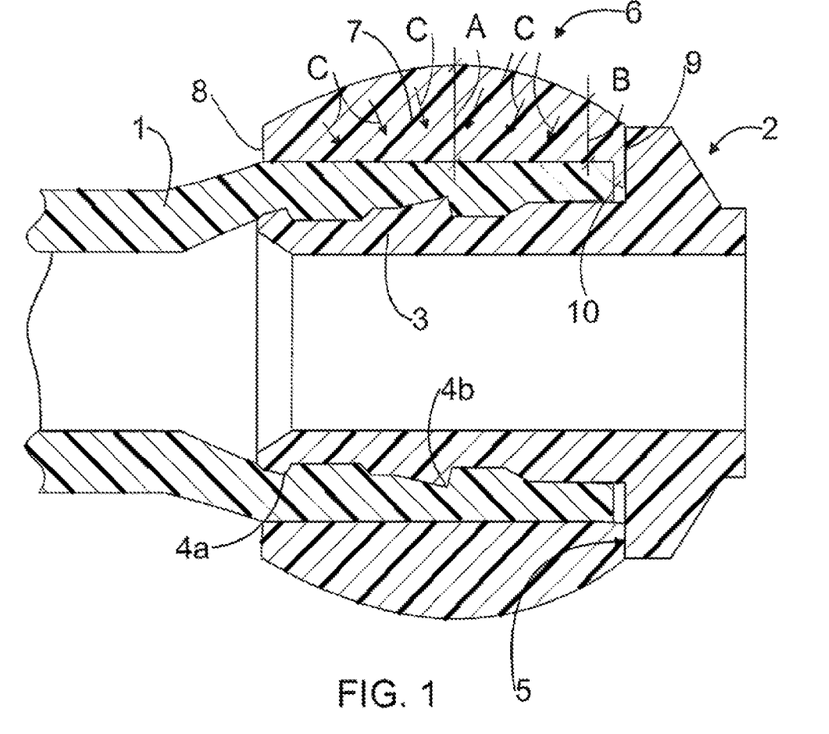

FIG. 1 shows a pipe 1, which is comprised of a plastic material having memory properties, for instance a cross-linked polyethylene PEX or any other cross-linked polyolefin, and a connecting piece 2 made of metal. The connection piece 2 can also be made of a hard plastic material or any other material that is hard enough, for example. Examples of the material the connecting piece 2 can be made of are poly(phenylenesulfone) PPSU and glass-reinforced plastic GRP. The connecting piece 2 comprises a nipple end 3. The nipple end 3 comprises radially projecting flanges 4a, 4b. The nipple end 3 is terminated with a radial abutment surface 5.

The nipple end 3 has an outer diameter which exceeds the inner diameter of the unexpanded pipe 1. A clamping ring 6 is mounted on an end of the pipe 1. In its relaxed state, the clamping ring 6 has an inner diameter which corresponds to the outer diameter of the unexpanded pipe 1.

When establishing the pipe connection shown in FIG. 1, the end of the pipe 1 and the surrounding clamping ring 6 are expanded simultaneously by an expander tool. The nipple end 3 is then immediately inserted into the end of the pipe until the abutment surface 5 is in abutment with the end of the pipe 1 and with the clamping ring 6. The end of the pipe 1 and the clamping ring 6 then shrink or contract automatically so as to obtain a sealing contact between the inner surface of the pipe and the flange in particular. The sealing contact is also obtained between the inner surface of the pipe 1 and the outer surface of the nipple end 3.

The clamping ring 6 comprises a body 7. The body is made of a plastic material that has memory properties, such as polyolefins, e.g. polyethylene PE or cross-linked polyethylene PEX. The body may be made for example of a cross-linked polyethylene PEX or of a cross-linked polypropylene. Preferably, the body 7 is made of a PEX-B material, i.e. a silane PEX. When a PEX-B material is used, cross-linking starts by the effect of heat. Therefore, PEX-B material is advantageous in connection with injection moulding. It is also possible to make the body 7 from a PEX-A or PEX-C material or from polyethylene having raised temperature resistance PE-RT. The body 7 can also be made of propylene-based elastomer, such as ethylene/propylene/diene EPDM. Also other rubbers and elastomers, such as thermoplastic elastomer TPE, thermoplastic urethane elastomer TPU and liquid silicone rubber LSR, are possible materials for the body 7.

The clamping ring 6 is expanded mechanically. At room temperature, for example, the clamping ring can be expanded mechanically without heating or warming. At room temperature, for example, the clamping ring 6 also shrinks or contracts automatically without heating or warming.

The clamping ring 6 can also be made of two or more materials. Such a clamping ring 6 can be made by using two component injection moulding, for example.

Seen in its axial direction, the clamping ring 6 has a first end 8 and a second end 9. The second end 9 is positioned close to the end of the pipe 1. Thus, the first end 8 is positioned at a distance from the end of the pipe 1.

The second end 9 of the clamping ring 6 is provided with a stop edge 10. The stop edge 10 ensures that the end of the pipe 1 is at correct position with respect to the clamping ring 6. The stop edge 10 extends inwards. In the embodiment shown in FIGS. 1 and 2, the stop edge 10 is formed of protrusions 11a, 11b, 11c extending inwards. The protrusions 11a, 11b, 11c ensure that the pipe 1 stops at the correct position with respect to the clamping ring 6. Further, the protrusions 11a, 11b, 11c are made high enough for the clamping ring to be used for protecting the nipple end 3 of the connection piece 2 before the pipe connection is made. The inner diameter of the clamping ring 6, when the clamping ring 6 is in its original form and shape, is larger than the outer diameter of the nipple end 3. However, the protrusions 11a, 11b, 11c are high enough to extend to a circumference that is smaller than the outer diameter of the flange 4b of the nipple end 3. Thus, the clamping ring 6 can be snapped on the nipple end such that the protrusions 11a, 11b, 11c and the flange 4b hold the clamping ring 6 upon the nipple end 3. Thus, the clamping ring 6 protects the nipple end 3 from being damaged, which could cause leakage problems. Thus, during storage and transportation, the nipple end 3 is not damaged.

Figure 2:
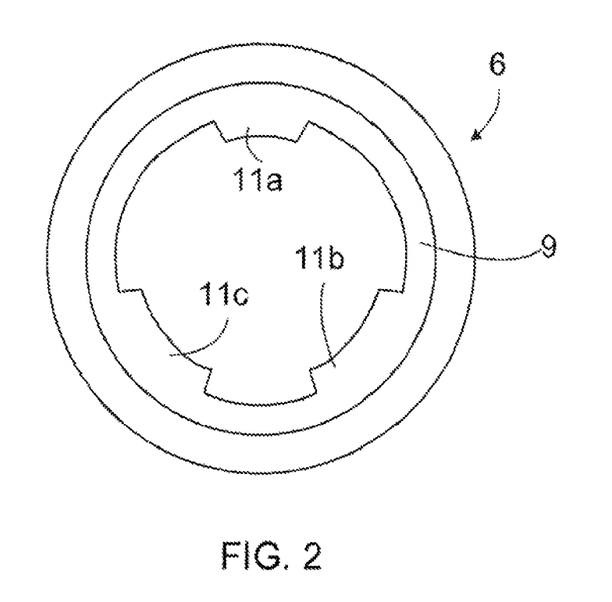
FIG. 2 schematically shows an end view of a clamping ring shown in FIG. 1.

Instead of the protrusions 11a, 11b, 11c, the stop edge can be formed of a ring or flange protruding radially inward. Moreover, the stop edge 10 may comprise both an inward protruding ring and protrusions formed in it. Even one single protrusion may form the stop edge. The number of protrusions may also be two and the number of protrusions may also be four or even more.

The embodiment according to which the stop edge 10 comprises both an inward protruding ring or flange and protrusions formed in it provides the feature that the ring or flange effectively holds the clamping ring 6 in its place on the end of the pipe 1 during expansion of the pipe 1 end and the clamping ring 6. The embodiment further provides the feature that snapping the clamping ring 6 on the nipple end 3 and removing the clamping ring 6 from the nipple end 3 does not require use of strong force.

Preferably the length of the stop edge 10 is so short that it is shorter than the wall thickness of the pipe 1. Thus the stop edge 10 does not extend inside the pipe 1. Preferably no part of the clamping ring 6 extends inside the pipe 1.

As shown in FIG. 2, the protrusions 11a, 11b, 11c are preferably not identical and symmetrically disposed around the clamping ring. In the embodiment shown in FIG. 2, protrusion 11a is smaller than protrusions 11b and 11c. Also, the distance between the protrusions 11a and 11b is larger than the distance between the protrusions 11b and 11c. Moreover, the shape of the protrusions 11a, 11b and 11c may differ from each other. Such differences and/or unsymmetricality can be used in handling of the clamping ring. Thus, the protrusions can be used for aligning the clamping ring for example for printing markings on the surface. The clamping rings can also be aligned for packaging, for example.

In FIG. 1, reference sign A depicts a first radial wall thickness A at a first position. In FIG. 1, the first position is at a distance from the first end 8.

FIG. 1 further depicts with reference sign B an example of a second radial wall thickness B at a second position. The second position is between the first position with a radial wall thickness A and the second end 9. The second radial wall thickness B is smaller than the first radial wall thickness A. The term radial wall thickness means the wall thickness of the body 7 of the clamping ring 6 in the radial direction from the inner surface of the body 7 to the outer surface of the body 7. The inner surface of the body 7 is the surface that is positioned against the outer surface of the pipe.

In the embodiment shown in FIG. 1, seen from the first end 8 of the clamping ring 6, the wall thickness of the body 7 first increases and thereafter decreases towards the second end 9. This can also be described such that the clamping ring 6 has an outer shape of a barrel. This provides the feature that the pressing force of the clamping ring is directed as illustrated with arrows C in FIG. 1. Thus, the compressive force concentrates very efficiently against the flange 4b, whereby the connection between the nipple end 3 of the connection piece and the inner surface of the pipe 1 is extremely tight. Moreover, after expansion, the time to tightness of the clamping ring and the connection is found to be rather short.

Figure 3:
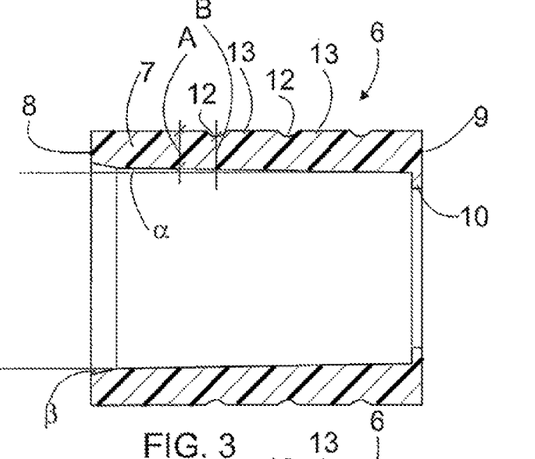
FIG. 3 schematically shows a cross sectional side view of a second clamping ring.

In the embodiment shown in FIG. 3, there are irregularities on the outer surface of the clamping ring 6. In the embodiment shown in FIG. 3, the irregularities are formed by grooves 12. Because of the grooves 12, also ridges 13 are formed between the grooves 12. The grooves 12 are positioned in the circumferential direction of the clamping ring 6. The grooves 12 may extend circumferentially around the clamping ring 6 or their length may be shorter than the circumferential length of the clamping ring 6. Moreover, there may be two or more successive grooves in the circumferential direction of the clamping ring 6.

In FIG. 3 it is shown that the inner surface of the clamping ring 6 may be conical. This feature enables the clamping ring 6 to be positioned at the end of the pipe 1 with a tight fitting. Also different outer diameters of different pipes caused by tolerance differences, for example, are compensated by this feature. Thus, because of the conical shape, it is easy to position the clamping ring at the end of the pipe 1 and, further, because of the conical shape, the inner surface of the clamping ring 6 presses against the outer surface of the pipe 1 and the clamping ring 6 remains with a tight fitting at the end of the pipe 1. Thus, it is easy to establish the pipe connection because the risk of the clamping ring 6 dropping off the pipe end is thus minimized. The coning angle α of the inner surface of the clamping ring 6 may be in the range of 0.1° to 2°, for example.

The inner surface of the clamping ring may also be made such that first, at the first end 8 of the clamping ring 6, there is a first larger coning angle β and thereafter, a second smaller coning angle α, as shown in FIG. 3. The bevel or the first larger coning angle β provides the advantage that positioning of the clamping ring 6 at the end of the pipe is extremely easy. Because of the second smaller coning angle α the clamping ring 6 remains with a tight fitting of the end of the pipe 1. The first coning angle β may be in the range of 3° to 45°, for example.

For the sake of clarity, this conical inner surface is shown only in connection with the embodiment in FIG. 3. It should be noted that the other embodiments shown in all the other figures may also be provided with a conical inner surface. For the sake of clarity, the conical inner surface is not shown in the other figures.

FIG. 3 also illustrates a first radial wall thickness A at a first position at a distance from the first end. FIG. 3 further illustrates a second radial wall thickness B at the second position between the first position and the second end 9. The second radial wall thickness B is smaller than the first radial wall thickness A.

Figure 4:
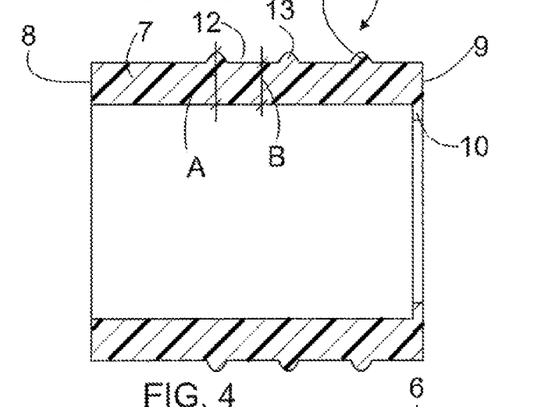
FIG. 4 schematically shows a cross sectional side view of a pipe connection using a third clamping ring.

In the embodiment shown in FIG. 4, the irregularities on the outer surface of the clamping ring are formed by ridges 13. Like the grooves 12 in FIG. 3, the ridges 13 are disposed in circumferential direction of the clamping ring. The ridges 13 may form continuous rings around the clamping ring in the circumferential direction of the clamping ring, or they may be shorter than the circumferential length of the clamping ring. There may also be two or more successive ridges 13 in the circumferential direction of the clamping ring. The ridges 13 form grooves 12 between them.

FIG. 4 also illustrates a first radial wall thickness A at a first position at a distance from the first end 8. FIG. 4 illustrates a second radial wall thickness B at a second position between the first position and the second end 9. The second radial wall thickness B is smaller than the first radial wall thickness A.

In the embodiment shown in FIG. 3, the ridges 13 between the grooves 12 are wider than the grooves 12. In the embodiment shown in FIG. 4, the grooves 12 between the ridges 13 are wider than the ridges 13. In the embodiment shown in FIG. 5, the width of the grooves 12 is substantially equal to the width of the ridges 13.

Instead of or in addition to the grooves and ridges the irregularities of the outer surface of the clamping ring 6 can be formed by forming protrusions and/or notches of any shape. Thus the protrusions and/or notches can be round or oval, for example, or have any other shape improving the grip of the assembler on the clamping ring. The clamping ring 6 is formed such that the irregularities on the outer surface of the clamping ring 6 exist already before the clamping ring 6 is positioned on the end of the pipe 1.

Figure 6:
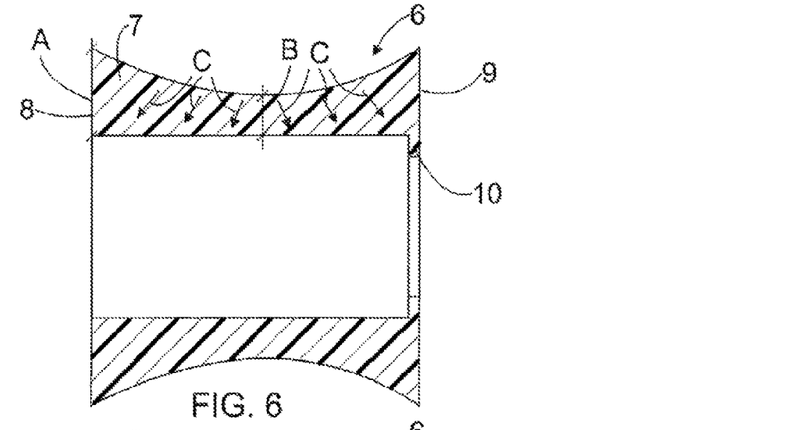
FIG. 6 schematically shows a cross sectional side view of a fifth clamping ring.

FIG. 6 discloses an embodiment in which, seen from the first end 8 of the clamping ring 6, the wall thickness first decreases and thereafter increases. Thus, the clamping ring 6 provides a pressing force which is illustrated with arrows C in FIG. 6. Thus, because of the shape of the clamping ring, the pipe end is pressed against the nipple end 3 from two positions such that the first position is before the flange 4b and the second position is after the flange 4b. This shape also provides very good tightness between the pipe and the connection piece 2. The time to tightness of the connection is also rather short.

FIG. 6 illustrates a first radial wall thickness A at a first position, where the first position is at the first end 8 of the clamping ring. Moreover, a second radial wall thickness B at a second position which is between the first position and the second end 9 is illustrated. The second radial wall thickness B is smaller than the first radial wall thickness A. In the embodiment shown in FIG. 6, the second position with a second radial wall thickness B is substantially in the middle of the clamping ring 6.

Figure 5:
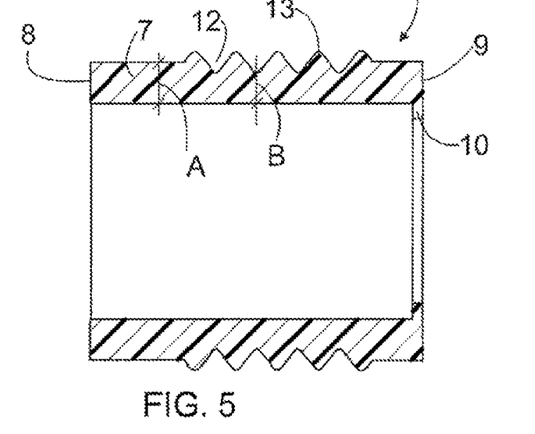
FIG. 5 schematically shows a cross sectional side view of a fourth clamping ring.
Figure 7:
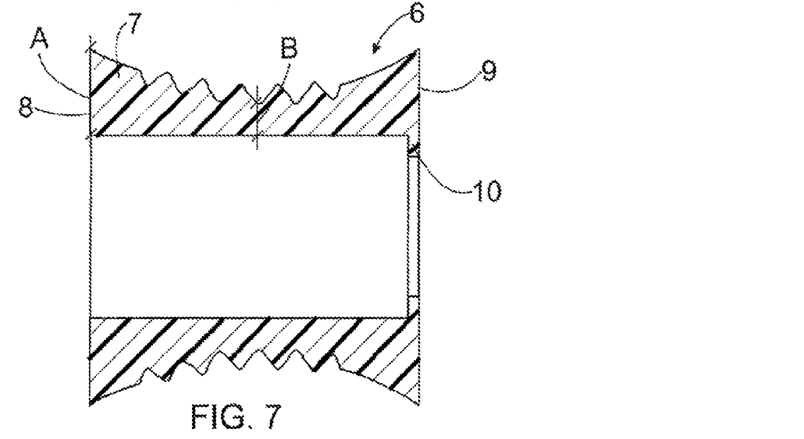
FIG. 7 schematically shows a cross sectional side view of a sixth clamping ring.

FIG. 7 shows an embodiment which is a combination of FIGS. 5 and 6. Thus, first, the average wall thickness of the clamping ring decreases and, thereafter, the average wall thickness increases. The outer surface of the clamping ring is provided with grooves 12 and ridges 13.

Figure 8:
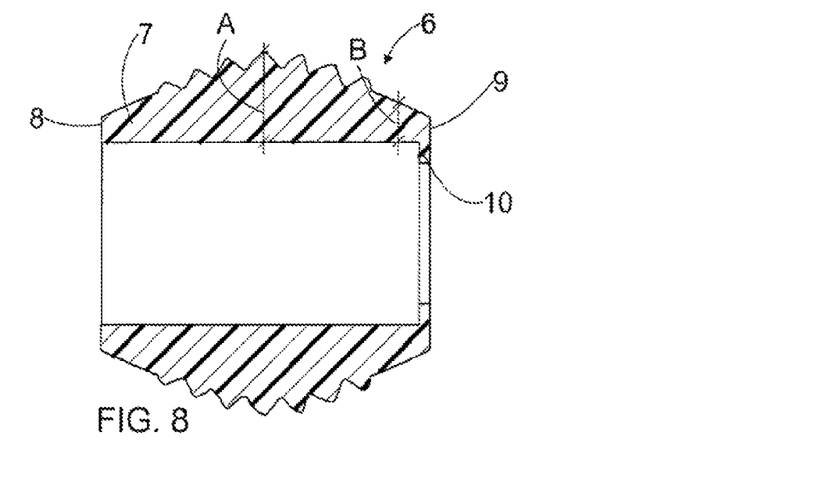
FIG. 8 schematically shows a cross sectional side view of a seventh clamping ring.

In an embodiment shown in FIG. 8, the features of the clamping ring 6 shown in FIG. 1 are combined with features of the clamping ring shown in FIG. 5. Thus, first, the average wall thickness of the clamping ring increases and, thereafter, it decreases. The outer surface of the clamping ring is provided with grooves 12 and ridges 13.

Figure 9:
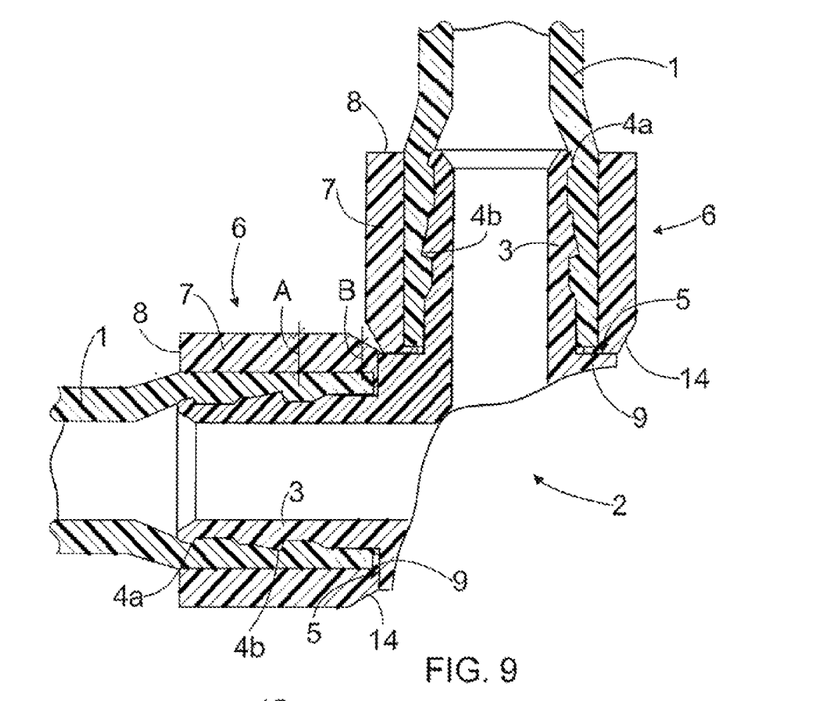
FIG. 9 schematically shows a cross sectional side view of a pipe connection having an eighth clamping ring.

In the embodiment shown in FIG. 9, the clamping ring 6 has been formed such that it does not have an elbow at the second end 9. In other words, the clamping ring 6 has a flat elbow at the second end 9. The lack of the elbow provides the advantage that for example in a T-joint the connection piece can be made smaller because the elbows of different clamping rings do not collide. In the embodiment shown in FIG. 9, the elbow is removed by forming a bevel 14 at the second end 9. The elbow can also be removed by forming a rounding at the second end, for example. In this connection, it should also be noted that in the embodiments shown in FIGS. 1, 8 and 14 the clamping rings 6 are formed without an elbow at the second end 9.

Figure 10:
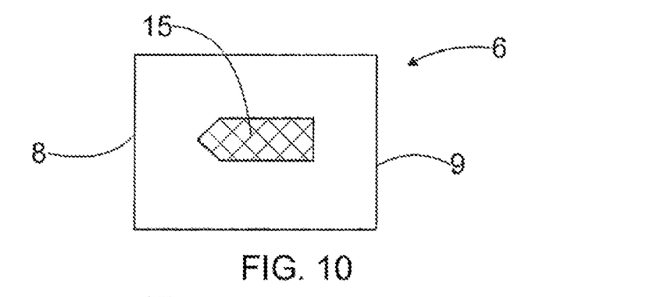
FIG. 10 schematically shows a side view of a ninth clamping ring.

FIG. 10 illustrates a marking 15 on the outer surface of the clamping ring 6. The marking 15 can illustrate the direction of mounting on the pipe end 1, for example. Moreover, the marking 15 can show the size and material of the clamping ring, for example.

The marking 15 may also be made using a colouring agent which is an example of an optical indicator. In FIG. 10, the cross-hatching illustrates a colour in the marking 15. By optical indicators useful information can be distributed for example such that a clamping ring and a pipe having the same size have a similar optical indicator such as a same colour.

Figure 11:
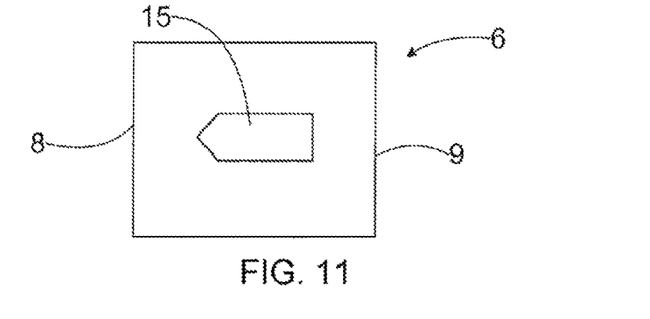
FIG. 11 schematically shows a clamping ring according to claim 10 after expanding.

The optical indicator may be made such that the colour changes or disappears permanently or non-recoverably during the expansion of the clamping ring 6. FIG. 11 illustrates this feature. The colouring agent may be such that it is so hard that it cracks when expanded and thus loses or changes its colour. The colouring agent may lose or change its colour also partly. Thereby, it can be easily detected that the clamping ring has been expanded, and its reuse can be avoided.

The optical indicator can be provided on the clamping ring by painting or printing, for example. The optical indicator can be provided on the clamping ring also by using two component injection moulding, in mould labelling or in mould decoration, for example.

Figure 12:
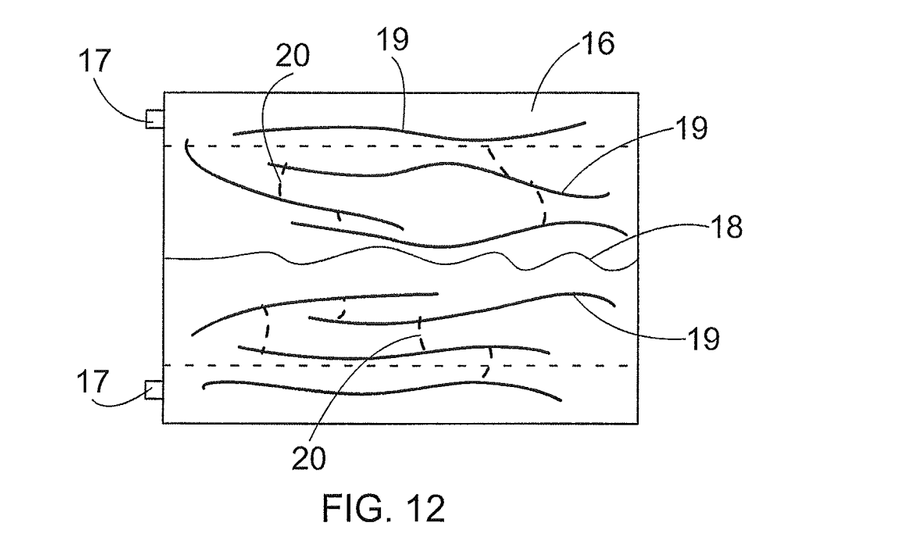
FIG. 12 schematically depicts an injection moulding process of a clamping ring.
Figure 13:
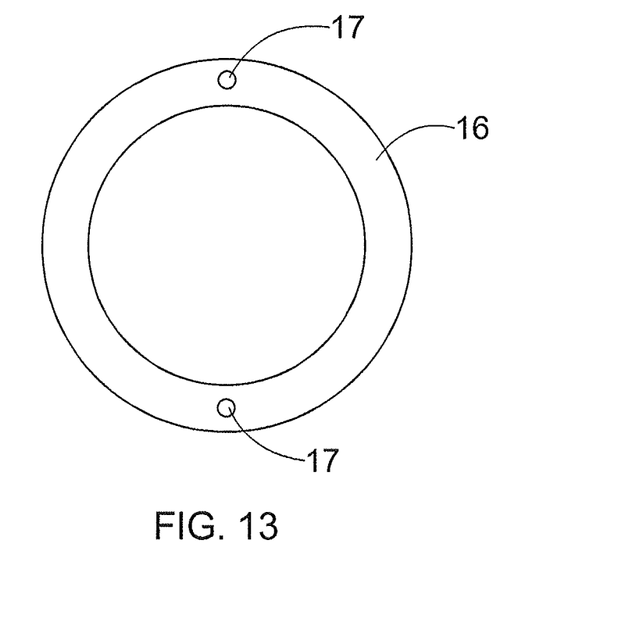
FIG. 13 schematically shows an end view of FIG. 12.

FIGS. 12 and 13 show an injection-mould 16 for forming a clamping ring 6. When a clamping ring is injection moulded, the material is fed into the mould 16 through an injection gate 17. In the embodiment shown in FIGS. 12 and 13, the injection mould 16 comprises as an example two injection gates 17. The injection gates 17 are positioned at one end of the injection mould, seen in the axial direction. The injection gates 17 need not be positioned exactly at the end of the injection mould but it is enough that the injection gates 17 are positioned close to one end of the injection mould. The definition that the injection gates 17 are close to the end of the injection mould means that the injection gates are at the end of the injection mould or their distance from the end of the injection mould is shorter than 20% of the total axial length of the clamping ring 6.

Thus, the material flows mainly along the axial direction of the clamping ring during the injection moulding process. The two material flows injected through the injection gate 17 flow in the mould such that they come into contact with each other. Therefore, a weld line 18 is formed at the point where the material flows unite. However, because the material is fed from an end of the injection mould, the weld line 18 is not very straight but the two material flows unite such that the weld line is not very weak. Moreover, because the material flows mainly in the axial direction, the polymer chains 19 are also orientated in the axial direction, as illustrated with lines 19 in FIG. 17. This provides the feature that cross linking bonds illustrated with lines 20 between the polymer chains 19 are rather short. All these features provide the advantage that the clamping ring is very strong, durable and has a short time to tightness.

If a stop edge is formed at the second end of the clamping ring, then the injection gates are preferably positioned at the second end of the clamping ring.

The number of injection gates can be any. Thus only one injection gate is possible and the number of injection gates may also be three or more. Yet further, the material can be fed to the injection mould 16 through a ring nozzle. By using a ring nozzle, the weld line or weld lines could be totally avoided.

The diameter of the clamping ring 6 may vary for example between 15 to 50 mm. The length of the clamping ring 6 may be for example substantially equal to the diameter of the clamping ring. The length of the clamping ring may also be dimensioned such that it is substantially equal to the length of the nipple end 3 of the connecting piece 2. An average wall thickness of the clamping ring may vary for example between 2 to 6 mm. The wall thickness of the clamping ring determines the contraction force of the clamping ring. Thus, the wall thickness of the clamping ring is dimensioned such that the contraction force is sufficient.

The clamping ring 6 may also be provided with a female form at one end and a male form at the other end. By such female and male forms the clamping ring 6 can be easily stacked with another clamping ring.

Figure 14:
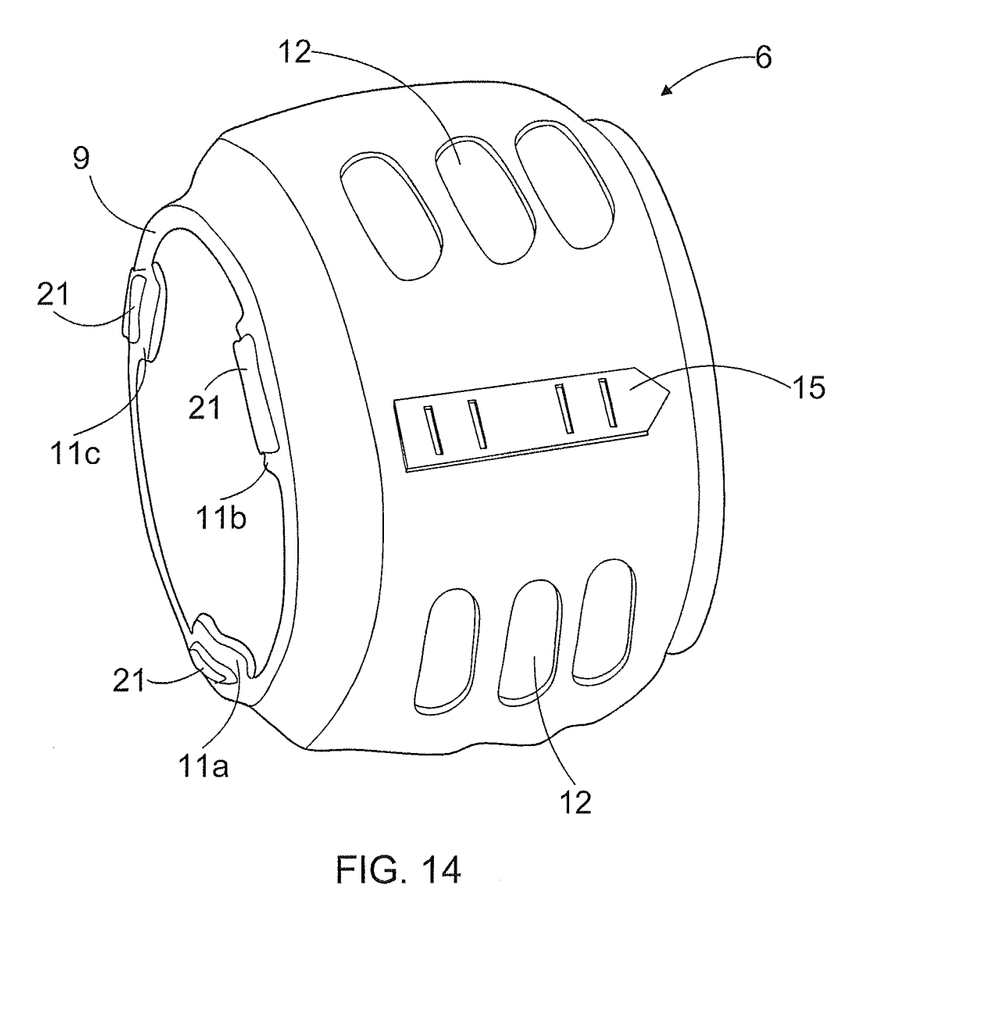
FIG. 14 schematically shows a tenth clamping ring.

FIG. 14 schematically depicts one embodiment of the male form described above. In the clamping ring 6 shown in FIG. 14, the protrusions 11a, 11b and 11c are provided with protrusions 21 extending in the axial direction of the clamping ring 6. Thus, the protrusions 21 form the male form used for stacking the clamping rings 6.

When stacking the clamping rings 6 the outer surfaces of the protrusions 21 at the second end 9 of the clamping ring are positioned against an inner surface of the clamping ring 6 at the first end 8 of the clamping ring, which inner surface of the first end 8 forms the female form for stacking the clamping rings.

In the embodiment shown in FIG. 14, the grooves 12 are rather short. However, they form irregularities on the outer surface of the clamping ring 6 and thereby improve the grip of the assembler on the clamping ring.

The marking 15 is also formed by protrusions and grooves. Thus, in this embodiment also the marking 15 forms irregularities on the outer surface of the clamping ring 6. The marking 15 can be made during an injection moulding process. Thus, the surface of the injection mould may be provided with appropriate forms forming the marking.

The clamping ring 6 can be made by using injection moulding, for example. It is also possible to extrude a pipe and thereafter cut the pipe into a pipe part and thereafter form the pipe part to have the desired form by using thermoforming, or machining, for example. Yet further, the embodiment shown in FIGS. 10 and 11, for example, can be made by extruding a pipe and cutting the pipe to form a pipe part and thereafter forming an appropriate marking on the outer surface of the pipe part. It is also possible to make a cylindrical clamping ring by injection moulding and thereafter form a desired form to the clamping ring by thermoforming or machining, for example.

It will be obvious to a person skilled in the art that, as the technology advances, the inventive concept can be implemented in various ways. The invention and its embodiments are not limited to the examples described above but may vary within the scope of the claims.

In some cases, the features disclosed in the present application may be used as such, irrespective of other features. On the other hand, when necessary, the features disclosed in the present application may be combined so as to provide different combinations.

Thus, the marking described in connection with FIGS. 10 and 11 can be applied to any clamping ring, for example. Also, any of the clamping rings can be formed to have a flat elbow. As said earlier, any other combination of features is also possible.

As discussed in connection with the embodiment shown in FIG. 3, for example, the clamping ring has an inner surface having the shape of a convergent cone. In that embodiment, the inner surface converges towards the second end 9 of the clamping ring 6. In that embodiment the inner surface is straight, which means that the coning angle α is constant. The inner surface may also have the form of a curve which means that the coning angle may vary. The coning angle may first be larger at the first end than at the second end and then become smaller and even zero towards the second end of the clamping ring. In another embodiment, it is also possible to form the inner surface such that first the coning angle is smaller or even zero and then larger near the second end of the clamping ring. It is also possible to make the inner surface of the clamping ring such that first its diameter decreases and thereafter increases towards the second end of the clamping ring. In all previous embodiments the inner surface of the clamping ring with the smallest inner diameter presses against the outer surface of the pipe and the clamping ring remains with a tight fitting at the end of the pipe 1. It is also possible to make a protrusion or other shape in the inner surface of the clamping ring such that the protrusion or shape presses against the end of the pipe with a tight fitting for holding the clamping ring on the pipe end. The protrusion or shape can also be made of a different material than the body of the clamping ring. Further, it is possible to make the cross-section of the clamping ring oval such that it has a smallest diameter that is smaller than the outer diameter of the pipe end and a largest diameter that is larger than the outer diameter of the pipe end. The oval clamping ring can then be pressed into an essentially round form to allow the clamping ring to be positioned on the pipe end and when the pressing force is removed, the clamping ring tends to return towards its oval shape, its inner surface with the smallest diameter pressing against the pipe end for holding the clamping ring on the pipe end.

It is also possible to make the clamping ring such that its inner diameter is constant or that its inner diameter continuously decreases towards the second end of the clamping ring.

It is also possible to make the length of the clamping ring 6 smaller than the length of the nipple end 3. This embodiment provides the feature that when the clamping ring 6 and the end of the pipe 1 are positioned on the nipple end 3 the outer end of the nipple end 3, can be seen through the pipe, if the pipe is made of a translucent material, for ensuring that the end of the nipple end 3 is positioned correctly inside the pipe end.

Also in the embodiments described with reference to FIGS. 1 and 9 the clamping ring 6 can be made such that the second radial wall thickness B is smaller than the first radial wall thickness A already before the clamping ring 6 is positioned on the end of the pipe 1.

The invention claimed is:

1. A clamping ring that, in use, presses a pipe against a connecting piece by back shrinkage, the clamping ring comprising: a barrel-shaped body including a plastic material having memory properties, wherein the body has: a first end to be positioned at a distance from an end of the pipe and a second end to be positioned close to the end of the pipe; a first position at the first end or at a distance from the first end having a first radial wall thickness (A); and at least one second position between the first position and the second end having a second radial wall thickness (B), wherein the second radial wall thickness (B) is smaller than the first radial wall thickness (A), wherein the body is configured to automatically shrink, without heating, so as to cause a seal between an inner surface of the pipe and an outer surface of the connecting piece, wherein the clamping ring includes a stop edge extending inward.

2. A clamping ring as claimed in claim 1, wherein the body has an irregular outer surface.

3. A clamping ring as claimed in claim 2, wherein the body has a cross-sectional shape such that, seen from the first end of the clamping ring, the wall thickness first increases and thereafter decreases.

4. A clamping ring as claimed in claim 2, wherein the irregular outer surface is formed by ridges.

5. A clamping ring as claimed in claim 4, wherein the body has a cross-sectional shape such that, seen from the first end of the clamping ring, the wall thickness first increases and thereafter decreases.

6. A clamping ring as claimed in claim 4, wherein the ridges are directed along the circumference of the clamping ring.

7. A clamping ring as claimed in claim 6, wherein the body has a cross-sectional shape such that, seen from the first end of the clamping ring, the wall thickness first increases and thereafter decreases.

8. A clamping ring as claimed in claim 1, wherein the body has a cross-sectional shape such that, seen from the first end of the clamping ring, the wall thickness first increases and thereafter decreases.

9. A clamping ring as claimed in claim 1, wherein the outer surface of the clamping ring is provided with an optical indicator.

10. A clamping ring as claimed in claim 9, wherein the optical indicator is made of material that changes its optical appearance when the clamping ring is expanded.

11. A clamping ring as claimed in claim 1, wherein the body has a wall thickness that, starting from the first end, increases and thereafter decreases toward the second end.

12. A clamping ring, that, in use, presses a pipe against a connecting piece by back shrinkage, the clamping ring comprising: a barrel-shaped body including a plastic material having memory properties, wherein the body has: a first end to be positioned at a distance from an end of the pipe and a second end to be positioned close to the end of the pipe; a first position at the first end or at a distance from the first end having a first radial wall thickness (A); and at least one second position between the first position and the second end having a second radial wall thickness (B), wherein the second radial wall thickness (B) is smaller than the first radial wall thickness (A), wherein the body is configured to automatically shrink, without heating, so as to cause a seal between an inner surface of the pipe and an outer surface of the connecting piece, wherein the clamping ring has a flat elbow at the second end and the second end of the clamping ring is shaped to have an outer bevel.

13. A clamping ring as claimed in claim 12, wherein the body has a cross-sectional shape such that, seen from the first end of the clamping ring, the wall thickness first increases and thereafter decreases.

14. A clamping ring that, in use, presses a pipe against a connecting piece by back shrinkage, the clamping ring comprising: a barrel-shaped body including a plastic material having memory properties, wherein the body has: a first end to be positioned at a distance from an end of the pipe and a second end to be positioned close to the end of the pipe; a first position at the first end or at a distance from the first end having a first radial wall thickness (A); and at least one second position between the first position and the second end having a second radial wall thickness (B), wherein the second radial wall thickness (B) is smaller than the first radial wall thickness (A), wherein the body is configured to automatically shrink, without heating, so as to cause a seal between an inner surface of the pipe and an outer surface of the connecting piece, wherein the inner surface of the clamping ring is conical.

15. A clamping ring as claimed in claim 14, wherein the body has a cross-sectional shape such that, seen from the first end of the clamping ring, the wall thickness first increases and thereafter decreases.

16. A clamping ring that, in use, presses a pipe against a connecting piece by back shrinkage, the clamping ring comprising: a barrel-shaped body including a plastic material having memory properties, wherein the body has: a first end to be positioned at a distance from an end of the pipe and a second end to be positioned close to the end of the pipe; a first position at the first end or at a distance from the first end having a first radial wall thickness (A); and at least one second position between the first position and the second end having a second radial wall thickness (B), wherein the second radial wall thickness (B) is smaller than the first radial wall thickness (A), wherein the body is configured to automatically shrink, without heating, so as to cause a seal between an inner surface of the pipe and an outer surface of the connecting piece, wherein the body has an irregular outer surface formed by ridges.

17. A clamping ring as claimed in claim 16, wherein the ridges are directed along the circumference of the clamping ring.

18. A clamping ring as claimed in claim 17, wherein the body has a cross-sectional shape such that, seen from the first end of the clamping ring, the wall thickness first increases and thereafter decreases.

19. A clamping ring as claimed in claim 16, wherein the body has a cross-sectional shape such that, seen from the first end of the clamping ring, the wall thickness first increases and thereafter decreases.

20. A clamping ring as claimed in claim 16, wherein the inner surface of the clamping ring is conical.

* * * * *